United States Patent Office 2,941,974
Patented June 21, 1960

2,941,974

VINYL CHLORIDE-VINYLIDENE CHLORIDE SANITARY CAN COATING SOLUTION HAVING IMPROVED ADHESION

George L. Reymann, Sewickley, and George W. Gerhardt, Ross Township, Allegheny County, Pa., assignors, by mesne assignments, to American-Marietta Company, Stoner-Mudge Co. Division, Chicago, Ill., a corporation of Illinois No Drawing. Filed July 27, 1956, Ser. No. 600,414

9 Claims. (Cl. 260—32.8)

This invention relates to preparing and applying coatings for metal surfaces, particularly interior and exterior metal surfaces of containers for foods, beverages and other products, including closures for such containers, and relates to the resultant coated article.

The development of improved sanitary coatings for food and beverage containers, and their closures, requires consideration of many special requirements which must be observed in regard to such coatings. The combination of good adherence with the quality of being free of any tendency to impart flavor to foods or beverages, is particularly difficult to achieve, especially in combination with good solubility in liquid aromatic hydrocarbon solvents, which are relatively inexpensive and available. Among the most widely used coating resins are copolymers of vinyl chloride and vinyl acetate, but these copolymers require solvents which include large amounts of relatively expensive ketone or like active solvents, with not more than a low percentage of liquid aromatic hydrocarbon solvents. The Gray and Reymann U.S. Patent No. 2,675,334 discloses the use of certain copolymers of vinyl chloride and vinylidene chloride in coating compositions employing high percentages of liquid aromatic hydrocarbon solvents, but these compositions do not have sufficiently strong adhesion for some sanitary coating purposes. The use of oleoresinous varnish modifiers with certain vinyl resins offers a solution of the problem of adhesion, but raises problems of detectable flavor and odor in some cases, due to the presence of the oleoresinous modifier. A different solution has therefore been sought for the problem of providing a coating composition having the combined qualities of strong adhesion, lack of any tendency to impart flavor, and solubility in mixed solvents containing high concentrations of liquid aromatic hydrocarbon solvents.

The present invention provides such a coating compositon, and utilizes for that purpose the combination of two different copolymers, hereinafter referred to as copolymers A and B, which are compatible in solution in liquid organic solvent containing at least 75% by weight of one or a mixture of liquid aromatic hydrocarbon solvents, e.g., benzene, toluene and xylene, and their liquid homologs, and condensed aromatic hydrocarbon liquid solvents, e.g., methyl naphthalene. In those cases where a stronger solvent is needed than is provided by liquid aromatic solvents alone, the balance of the solvent (up to 25% by weight) is made up of an admixture of more active liquid organic solvents for vinyl resins, e.g., liquid ketone solvents, such as methyl ethyl ketone and methyl isobutyl ketone, liquid ester solvents, such as ethyl acetate and butyl propionate, chlorinated hydrocarbons, such as chlorobenzene, cyclic ethers, such as tetrahydropyran and tetrahydrofuran, nitroparaffins, such as 2-nitropropane, and others, such as isophorone, cyclohexanone, dimethyl formamide, acetonitrile, and propylene carbonate. The maximum proportion of aromatic hydrocarbon solvents in the total solvent mixture used in the composition, varies with the varying proportions of the two copolymers with respect to each other, and may closely approach 100% aromatic hydrocarbon solvents, as hereinafter illustrated in Table I. When the composition is coated and baked on metal surfaces, e.g., tin, steel and aluminum surfaces, the combined copolymers form a tough, adherent coating which is free of any tendency to impart flavor or odor to foods or the like with which the coating may be in contact.

Copolymer A of the invention is one or a mixture of copolymers of vinyl chloride and vinylidene chloride in proportions ranging from about 30% to about 75% by weight of vinyl chloride, the balance being vinylidene chloride. These proportions have the effect of making copolymer A soluble in a solvent consisting solely of liquid aromatic hydrocarbon solvents. More specifically, copolymer A is characterized by solubility in xylene at 25% solids concentration. Even within said range of proportions, it is necessary to control the polymerization conditions, or to purify the copolymer by filtration or otherwise, to ensure that the copolymer is substantially free of homopolymers of vinyl chloride and vinylidene chloride, respectively, or copolymers thereof which are outside of the above-stated range of proportions. Moreover, copolymer A must have a specific viscosity within the range of about 0.12 to about 0.30, inclusive, as determined at 25° C., using a 0.4% solution of the copolymer in nitrobenzene. A specific viscosity below the stated range results in a relatively brittle coating with poor thermal stability, and above the stated range results in excessively high solution viscosity for the purposes of the invention.

An example of copolymer A is made as follows: 82 parts of vinyl chloride and 18 parts of vinylidene chloride are placed together in a glass container at 20° C. and exposed, with agitation, to ultraviolet light, such as may be provided with a 100 watt G.E.-7 mercury vapor lamp. After 36 to 72 hours of such treatment the resulting mixture of copolymer and unreacted monomers is removed from the container and dried to remove the unreacted monomers. A copolymer of approximately 60% vinyl chloride and 40% vinylidene chloride is obtained, because the vinylidene chloride enters the copolymer at a faster rate than the vinyl chloride. Copolymers with other ratios of vinyl chloride and vinylidene chloride content may be prepared in a like manner by varying the proportions of the starting charges of vinyl chloride and vinylidene chloride. Other methods of producing a usable copolymer may be employed, such as the above method without ultraviolet light but with a catalyst, such as benzoyl peroxide, and, if necessary, with subsequent filtration to remove the homopolymers which are not soluble in aromatic hydrocarbon solvents. An example of a suitable commercially available copolymer of vinyl chloride and vinylidene chloride is "Geon 222" of B. F. Goodrich Chemical Company, Cleveland, Ohio, and "VCVC" of Bakelite Company, a division of Union Carbide and Carbon Corp., New York, N.Y., which have a vinyl chloride/vinylidene chloride ratio of substantially 60/40, and are useful for the purposes of the invention, subject to the above-identified requirements of xylene solubility, and of range of viscosity. The examples of "Geon 222" hereinafter referred to are those satisfying the said requirements.

Copolymer B of the invention is one or a mixture of copolymers consisting essentially of (1) a vinyl halide, preferably vinyl chloride, in proportions by weight of about 60% to about 95% by weight of the whole copolymer B; (2) material selected from aliphatic alpha, beta-mono-olefinic carboxylic acids and anhydrides (e.g., maleic acid, maleic anhydride, acrylic acid and methacrylic acid), esters of aliphatic alpha, beta-mono-olefinic carboxylic acids (e.g., dibutyl maleate), half esters of aliphatic alpha, beta-mono-olefinic dicarboxylic acids (e.g., monobutyl maleate), and partial esters of aliphatic alpha, beta-mono-olefinic polycarboxylic acids, the amount of such component (2) combined in copolymer B being about 0.1% to about 5% by weight of the whole copolymer B; and (3) a material constituting the balance of the weight of copolymer B, and selected from (a) vinyl esters of lower saturated fatty acids (e.g., vinyl acetate), or (b) esters of aliphatic alpha, beta-mono-olefinic carboxylic acids (e.g., dibutyl maleate). It will be noted that the last mentioned item (b) of component (3) also appears as one of the items which may be selected for item (2) and it is suitable for the purposes of the invention to select any of item (b) for both of said components (2) and (3). The primary function of component (2) is to impart the quality of superior adherence to the combination of the invention of copolymers A and B, when the said component (2) is copolymerized in copolymer B prior to the admixture of copolymer B with copolymer A. The primary function of component (3) is to render the combination of the invention of copolymers A and B compatible with each other, as evidenced by clarity in solution and in the final baked coating, and soluble at solids concentrations by weight of at least 18% in a solvent mixture consisting of at least 75% by weight of liquid aromatic hydrocarbon solvents, the balance being more active liquid organic solvents; the standard solvent mixture for testing such solubility is a mixture of 75 parts by weight of toluene, and 25 parts by weight of methyl ethyl ketone. The present preferred example of copolymer B is a copolymer of vinyl chloride, maleic acid and vinyl acetate in proportions by weight of 86/1/13, as exemplified by "VMCH" of Bakelite Company, a division of Union Carbide & Carbon Company, New York, N.Y., and in Campbell Patent No. 2,329,456. Other examples of copolymer B are "Exon 470" and "Exon 471" of Firestone Plastics Company, a division of Firestone Tire & Rubber Company, Pottstown, Pa., and "Geon 400 x 110" of B. F. Goodrich Chemical Company, a division of B. F. Goodrich Company, Cleveland, Ohio.

For the purposes of the invention, copolymer A constitutes about 80% to about 99.5% of the combined weight of copolymers A and B, the balance being copolymer B. Within such range the combined copolymers are compatible with each other, have strong adhesion when coated on metal surface and baked to expel the solvent in which they are dissolved, and are soluble, in a range of about 18% to about 40% solids by weight in a liquid organic solvent containing at least 75% by weight of one or a mixture of liquid aromatic hydrocarbon solvents, the balance of the solvent being one or a mixture of more active liquid organic solvents, as previously described. A high proportion of liquid aromatic hydrocarbon solvents in the solvent mixture is of great value, because of the availability and relatively low price of aromatic hydrocarbon solvents. It is possible, but usually undesirable for reasons of cost, to substitute the active liquid organic solvents for a part or all of the liquid aromatic hydrocarbon solvent component in the total solvent for the composition of the invention.

The composition of the invention is readily applied by conventional methods, such as spraying and roller coating, when dissolved in the above-stated solvent system at the required viscosities, and has excellent adhesion over a wide range of baking temperatures, from as low as 260° F. up to relatively high baking temperatures (such as those for wire coating) before thermal decomposition begins, depending on the time of bake and presence of thermal stabilizers. The lower temperatures serve, for example, to protect adjacent lithography, and the higher temperatures permit quick bakes for high speed production.

llustrative examples of the practice of the invention are as follows:

EXAMPLE I 22.5 parts by weight of a copolymer of vinyl chloride and vinylidene chloride in proportions by weight of about 60/40 ("Geon 222"), and 2.5 parts by weight of a second copolymer of vinyl chloride, maleic acid and vinyl acetate in proportions by weight of about 86/1/13 ("VMCH") are dissolved in a solvent consisting of 64 parts by weight of toluene and 11 parts by weight of methyl ethyl ketone. The resulting solution is clear and has a viscosity in No. 4 Ford Cup of 27 seconds at 80° F. When the solution is coated on tinplate primed with an oleoresinous lacquer, baked 6.5 minutes at 300° F. (the baked coating having a weight of about 5.5 mg./square inch), and tested, it is found to have a good rating for wet adhesion, and an excellent rating for dry adhesion and absence of pasteurization blush. When coated and baked on a glass panel, the composition is found to have an excellent rating for absence of any tendency to impart flavor.

EXAMPLE II 23.5 parts by weight of the first copolymer of Example I, and 0.5 part by weight of the second copolymer of Example I are dissolved in 76 parts by weight of the solvent mixture of Example I. The solution is clear and has a viscosity of 25 seconds in No. 4 Ford Cup at 80° F. When the solution is coated and baked as stated in Example I, the test ratings show less wet adhesion, but the other ratings remain excellent.

EXAMPLE III 22.8 parts by weight of the first copolymer of Example I and 1.2 parts by weight of the second copolymer of Example I are dissolved in 76 parts by weight of a solvent mixture of 65 parts of xylene and 11 parts of methyl isobutyl ketone. The resulting solution is clear and has a viscosity of 30 seconds at 80° F. in No. 4 Ford Cup. When coated and baked as stated in Example I, the test ratings are the same as in Example I.

Like results are obtained when said coating examples are baked on primed steel and aluminum surfaces, and, except for slightly less adherence, on bare tin, steel and aluminum surfaces. Like results are also obtained when employing the following illustrative examples of compositions of the invention:

EXAMPLE IV

| Components (percent by weight): | Parts by weight |
|---|---|
| Copolymer A | 91 |
|   Vinyl chloride (67%). | |
|   Vinylidene chloride (33%). | |
| Copolymer B | 9 |
|   Vinyl chloride (85%). | |
|   Monobutyl maleate (5%). | |
|   Vinyl acetate (10%). | |
| Solvent | 400 |
|   Methyl naphthalene (75%). | |
|   Isophorone (25%). | |

EXAMPLE V

| Components (percent by weight): | |
|---|---|
| Copolymer A | 89 |
|   Vinyl chloride (50%). | |
|   Vinylidene chloride (50%). | |
| Copolymer B | 11 |
|   Vinyl chloride (80%). | |
|   Maleic anhydride (5%). | |
|   Dibutyl maleate (15%). | |
| Solvent | 420 |
|   Xylene (75%). | |
|   Ethyl acetate (25%). | |

EXAMPLE VI

Components (percent by weight):
- Copolymer A _____ 95
  - Vinyl chloride (60%).
  - Vinylidene chloride (40%).
- Copolymer B _____ 5
  - Vinyl chloride (85%).
  - Monopropyl aconitate (3%).
  - Vinyl acetate (12%).
- Solvent _____ 400
  - Toluene (75%).
  - Methyl ethyl ketone (25%).

EXAMPLE VII

Components (percent by weight):
- Copolymer B _____ 90
  - Vinyl chloride (60%).
  - Vinylidene chloride (40%).
- Copolymer B _____ 10
  - Vinyl chloride (90%).
  - Dibutyl maleate (10%).
- Solvent _____ 400
  - Toluene (75%).
  - Methyl ethyl ketone (25%).

The following Table I illustrates by examples the effect of varying proportions of the two copolymers of the invention. In each of the examples in Table I, the copolymer A is a copolymer of vinyl chloride and vinylidene chloride in proportions by weight of about 60/40 ("Geon 222"), the copolymer B is a copolymer of vinyl chloride, maleic acid and vinyl acetate in proportions by weight of about 86/1/13 ("VMCH"), and the combined solvents are toluene and MEK (methyl ethyl ketone) in the proportions shown in the table. The resin combinations are noted as "S" (soluble) if they entirely dissolve, as evidenced by a clear solution and viscosity below 200 seconds in No. 4 Ford Cup at 80° F., at 18% solids by weight in the indicated solvent system; otherwise, they are noted as "I" (insoluble). As regards illustrative values of viscosities, it is found that solutions at 24% solids, of copolymers A ("Geon 222") and B ("VMCH") in proportions of 100/0 to 90/10 by weight, in a solvent mixture of toluene and methyl ethyl ketone in proportions of 85/15 by weight, have viscosities ranging from about 25 to about 35 seconds at 80° F. in No. 4 Ford Cup.

Table I
SOLUBILITY OF COMBINED COPOLYMERS A AND B

| Resin composition, Percent by weight of— | | Solvent System, Percent by weight of toluene/MEK | | | | |
|---|---|---|---|---|---|---|
| Copolymer A | Copolymer B | 100/0 | 95/5 | 90/90 | 85/15 | 75/25 |
| 100 | 0 | S | S | S | S | S |
| 99 | 1 | I | S | S | S | S |
| 98 | 2 | I | I | S | S | S |
| 95 | 5 | I | I | S | S | S |
| 90 | 10 | I | I | I | S | S |
| 80 | 20 | I | I | I | I | S |

Table II illustrates by examples the qualities of coatings of the combined copolymers of the invention, which are the same as those shown in Table I, after the combined copolymers are dissolved, coated on tinplate, and baked, as indicated in Example I.

The tests indicated in Table II were carried out according to the following procedures, after preparing specimens of the coatings baked on tinplate for 10 minutes at 300° F. at baked coating weights of about 5.5 mg./square inch:

(1) Dry adhesion: the coated surface of the specimen is cross-hatched with a blade and then pressure-sensitive tape ("Scotch" tape) is applied and rapidly pulled off to determine whether any of the coating is removable. The ratings are from 0 (failure) to 10 (excellent); 7 is the lowest acceptable rating, and 8 is good.

(2) Pasteurization blush: the coated specimen is treated with hot water in a bath maintained at 170° F. for 45 minutes and is then visually inspected for "blush," i.e., a whitening, blistering, spotting or dulling of the coating. The rating scale is the same as for dry adhesion.

(3) Wet adhesion: after treating and inspecting the coated specimen for pasteurization blush, the specimen is blotted dry and tested for adhesion in the same manner as stated above for dry adhesion. The rating scale is numerically the same as for dry adhesion, but the requirements are lower, because there is usually no fabrication after pasteurization. 5 is the minimum acceptable rating for wet adhesion when pasteurization is contemplated, but a lower rating is acceptable when there is to be no pasteurization, as in the case of can linings for soft drinks.

(4) Flavor: a clean glass panel is coated with the composition, baked 10 minutes at 300° F., immersed while still hot in a bath of distilled water, where the panel cools to room temperature and remains for 24 hours. The water in the bath is then tested for presence or absence of the slightest detectable flavor. No flavor at all is permissible where foods for human consumption are concerned.

Table II
QUALITIES OF BAKED COATINGS OF THE INVENTION

| Resin composition, Percent by weight of— | | Dry adhesion | Pasteurization resistance | | Flavor |
|---|---|---|---|---|---|
| Copolymer A | Copolymer B | | Blush | Adhesion | |
| 100 | 0 | 2 | 8 | 0 | None. |
| 99.5 | 0.5 | 8 | 8 | 4 | None. |
| 99 | 1 | 10 | 9 | 5 | None. |
| 98 | 2 | 10 | 9 | 5 | None. |
| 95 | 5 | 10 | 9 | 7 | None. |
| 90 | 10 | 10 | 9 | 9 | None. |
| 80 | 20 | 10 | 10 | 10 | None. |

As shown in Tables I and II, the composition of the invention has progressively less solubility in liquid aromatic hydrocarbon solvents, and progressively improved functional characteristics, as the amount of copolymer B is increased relative to copolymer A. Considering these factors in balance, the present preferred weight ratio of copolymers A and B is about 90/10.

Pigments, dyes, waxes and other non-reactants may be added to the composition of the invention for decorative purposes and the like, without otherwise materially affecting the significant characteristics of the composition. In addition, the composition of the invention may be modified with additives to enhance special properties.

While we have described present preferred embodiments of the invention and methods of practicing the same, it will be recognized that the invention is not limited thereto but may be otherwise variously embodied and practiced within the scope of the following claims.

We claim:

1. A solvent solution comprising at least 18% by weight of a resin component dissolved in an organic solvent medium, said organic solvent medium consisting of at least 75% by weight of normally liquid aromatic hydrocarbon solvent and up to 25% by weight of an active organic liquid solvent selected from the group consisting of methyl ethyl ketone, methyl isobutyl ketone, ethyl acetate, butyl propionate, chlorobenzene, tetrahydropyran, tetrahydrofuran, 2-nitropropane, isophorone, cyclohexanone, dimethyl formamide, acetonitrile and propylene carbonate, said resin component comprising copolymer A, constituting 80% to 99.5% by weight of said resin component, and copolymer B, constituting the balance of said resin component, copolymer A being a copolymer of 30–75% by weight of vinyl chloride and correspondingly 25–70% by weight of vinylidene chloride and being characterized by complete solubility in xylene at 25% solids concentration and by a specific viscosity of from 0.12 to 0.30 determined at 25° C. in 0.4% solution in nitrobenzene; copolymer B being a copolymer of a mixture of ingredients consisting essentially of (1) 60–95% by weight of a vinyl halide, (2) at least 0.1% by weight of monomer selected from the group consisting of aliphatic alpha, beta-mono-olefinic carboxylic acids, anhydrides of said acids and alkyl esters of said acids, said aliphatic alpha, beta-mono-olefinic carboxylic acids and anhydrides of said acids being present in an amount up to 5% by weight with any balance of said mixture being vinyl esters of lower saturated fatty acids, the ratio of proportions of said active organic liquid solvent to said aromatic solvent increasing as the ratio of proportions of said copolymer B increases to said copolymer A.

2. A solvent solution as recited in claim 1 in which said liquid aromatic hydrocarbon is selected from the group consisting of benzene, toluene and xylene.

3. A solvent solution as recited in claim 1 in which said copolymer B is a copolymer of (1) vinyl chloride, (2) maleic acid, and (3) vinyl acetate.

4. A solvent solution as recited in claim 1 in which said copolymer B is a copolymer of vinyl chloride, monobutyl maleate and dibutyl maleate.

5. A solvent solution as recited in claim 1 in which the weight ratio of copolymer A to copolymer B is about 90/10.

6. A solvent solution as recited in claim 1 in which copolymer A is a copolymer of vinyl chloride and vinylidene chloride in proportions by weight of about 60/40, copolymer B is a copolymer of vinyl chloride, maleic acid and vinyl acetate in proportions by weight of about 86/1/13, and the weight ratio of copolymer A to copolymer B is about 90/10.

7. A solvent solution comprising about 25% by weight of a resin component dissolved in an organic solvent medium, said organic solvent medium consisting of toluene and methyl ethyl ketone in weight ratio of about 64/11, said resin component being a mixture of a copolymer of vinyl chloride and vinylidene chloride with a copolymer of vinyl chloride, maleic acid, and vinyl acetate in proportions by weight of about 22.5/2.5, said copolymer of vinyl chloride and vinylidene chloride being a copolymer of about 60 parts by weight of vinyl chloride and about 40 parts by weight of vinylidene chloride characterized by complete solubility in xylene at 25% solids concentration and by a specific viscosity of from 0.12 to 0.30 determined at 25° C. in 0.4% solution of nitrobenzene, and said copolymer of vinyl chloride, maleic acid and vinyl acetate having monomer proportions by weight of about 86/1/13.

8. A solvent solution comprising about 24% by weight of a resin component dissolved in an organic solvent medium, said organic solvent medium consisting of toluene and methyl ethyl ketone in weight ratio of about 64/11, said resin component being a mixture of a copolymer of vinyl chloride and vinylidene chloride with a copolymer of vinyl chloride, maleic acid and vinyl acetate in proportions by weight of about 23.5/0.5, said copolymer of vinyl chloride and vinylidene chloride being a copolymer of about 60 parts by weight of vinyl chloride and about 40 parts by weight of vinylidene chloride characterized by complete solubility in xylene at 25% solid concentration and by a specific viscosity of from 0.12 to 0.30 determined at 25° C. in 0.4% solution in nitrobenzene, and said copolymer of vinyl chloride, maleic acid and vinyl acetate having monomer proportions by weight of about 86/1/13.

9. A solvent solution comprising about 24% by weight of a resin component dissolved in an organic solvent medium, said organic solvent medium consisting of toluene and methyl ethyl ketone in weight ratio of about 64/11, said resin component being a mixture of a copolymer of vinyl chloride and vinylidene chloride with a copolymer of vinyl chloride, maleic acid and vinyl acetate in proportions by weight of about 22.8/1.2, said copolymer of vinyl chloride and vinylidene chloride being a copolymer of about 60 parts by weight of vinyl chloride and about 40 parts by weight of vinylidene chloride characterized by complete solubility in xylene at 25% solid concentration and by a specific viscosity of from 0.12 to 0.30 determined at 25° C. in 0.4% solution in nitrobenzene, and said copolymer of vinyl chloride, maleic acid and vinyl acetate having monomer proportions by weight of about 86/1/13.

References Cited in the file of this patent

UNITED STATES PATENTS

| | | |
|---|---|---|
| 2,231,407 | Castor | Feb. 11, 1941 |
| 2,329,456 | Campbell | Sept. 14, 1943 |
| 2,459,125 | Cheyney | Jan. 11, 1949 |
| 2,461,613 | Quarles et al. | Feb. 15, 1949 |
| 2,646,414 | Gillespie | July 21, 1953 |
| 2,675,334 | Gray | Apr. 13, 1954 |
| 2,877,922 | De Cristoforo | Mar. 17, 1959 |